Feb. 12, 1952     P. E. GELDHOF     2,585,107
VIBRATION DAMPENER MOUNTING FOR
WASHING MACHINES AND THE LIKE
Filed Nov. 20, 1946     4 Sheets-Sheet 3
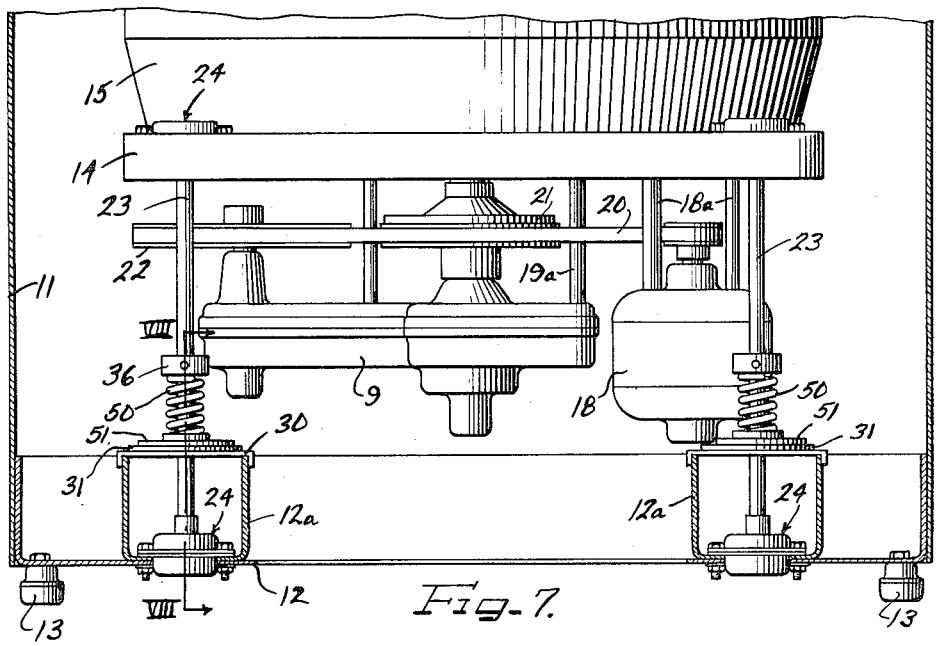
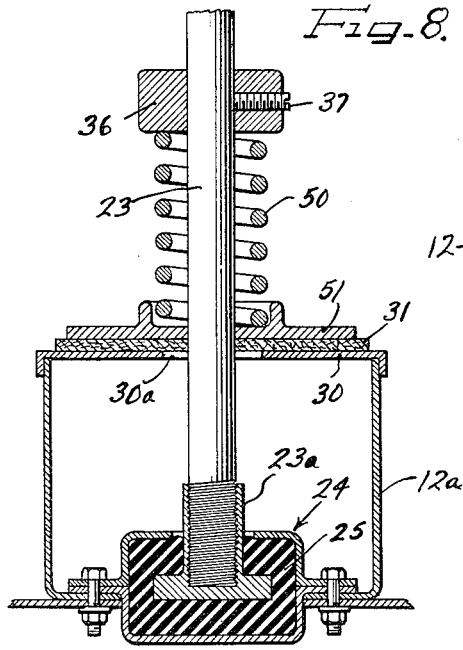
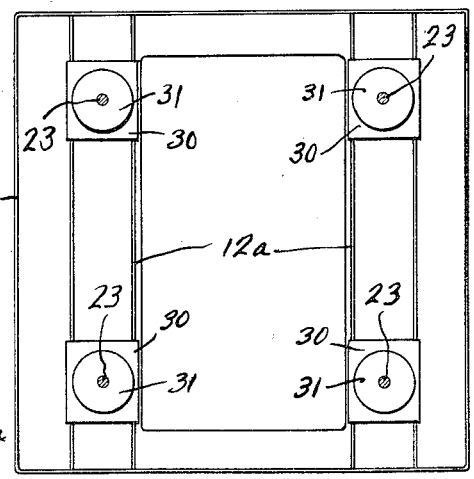
Inventor
Peter Eduard Geldhof
by The Firm of Charles W. Hills Attys Feb. 12, 1952 — P. E. GELDHOF — 2,585,107
VIBRATION DAMPENER MOUNTING FOR WASHING MACHINES AND THE LIKE
Filed Nov. 20, 1946 — 4 Sheets-Sheet 4

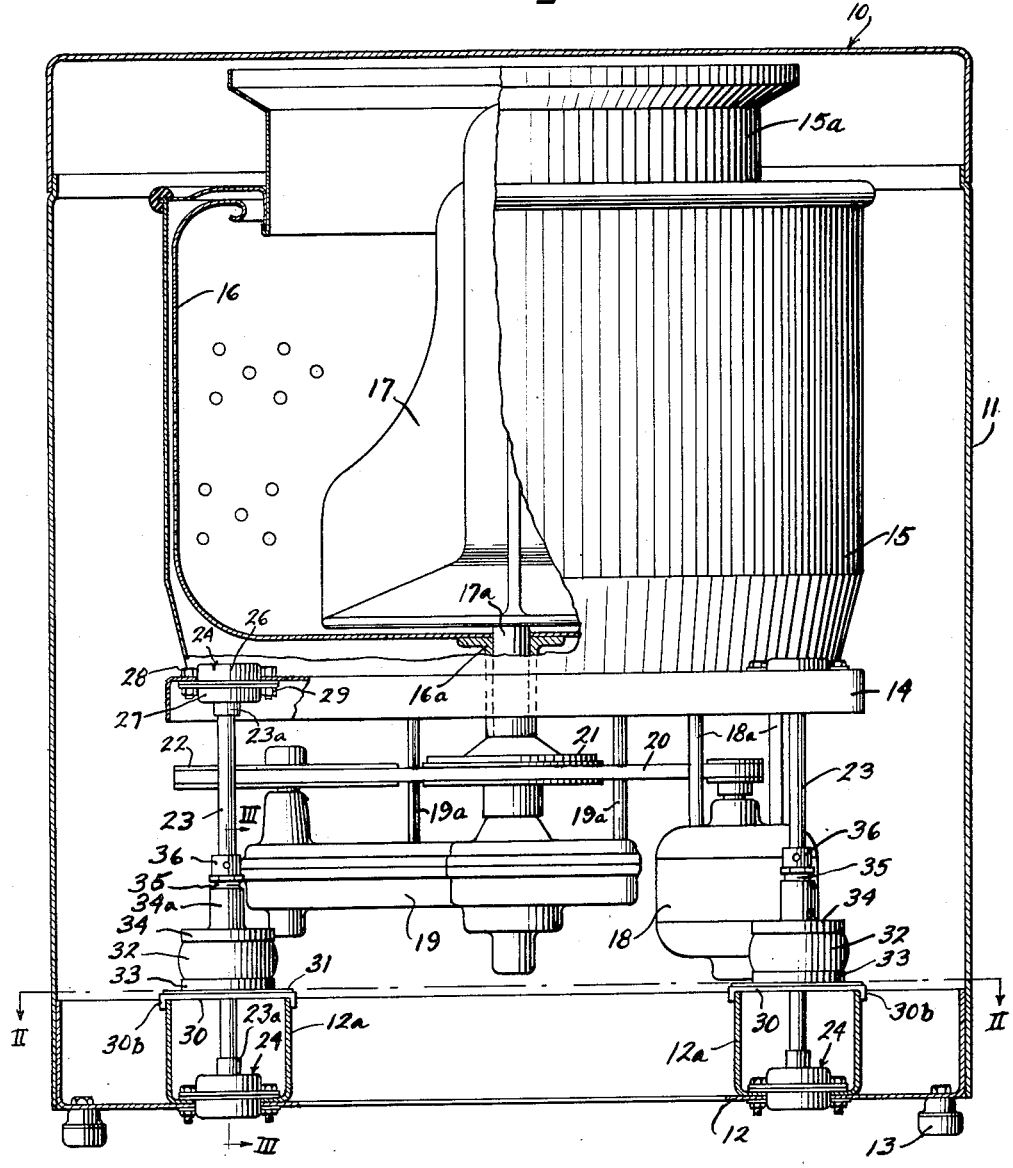

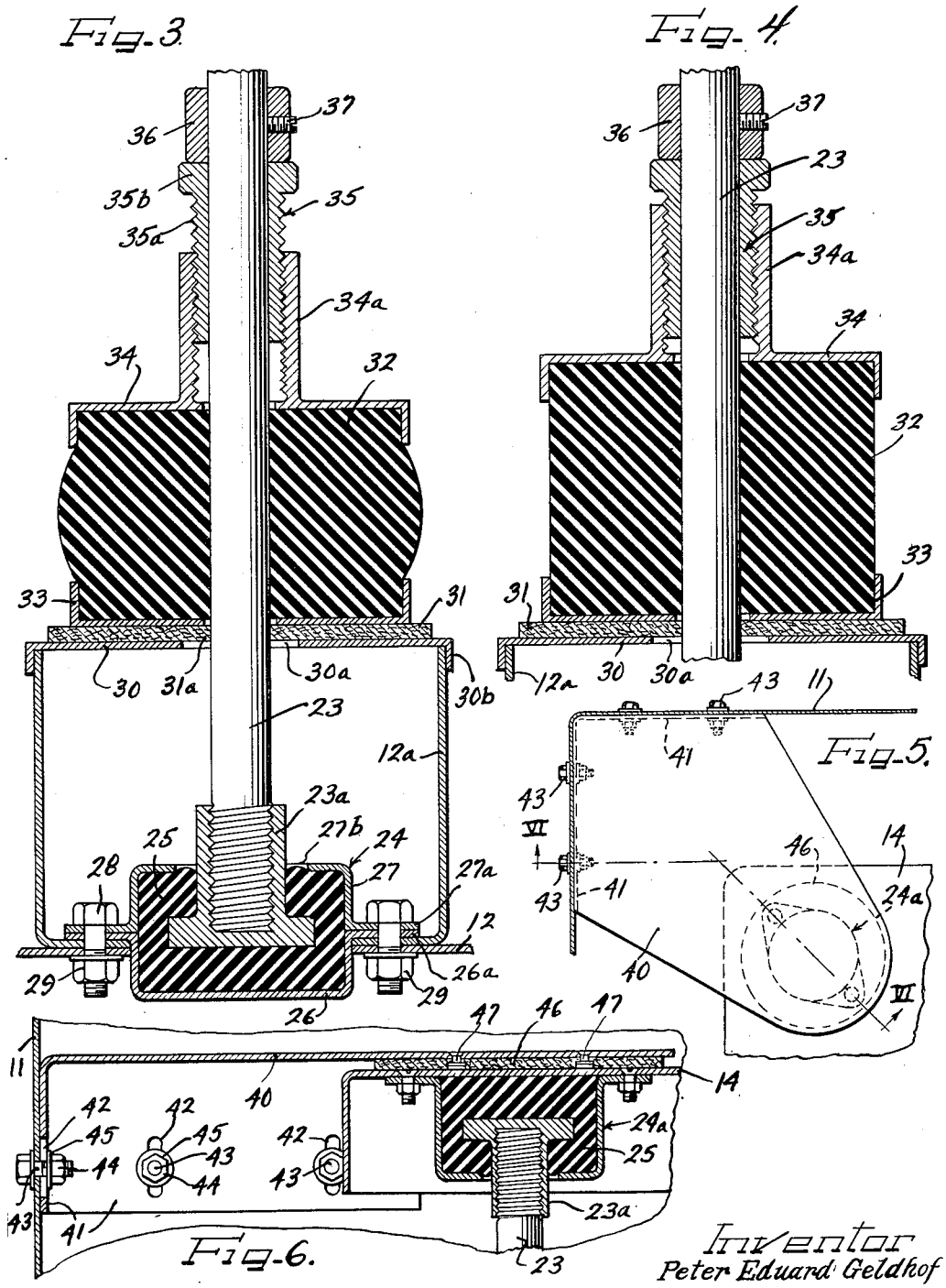

Inventor
Peter Eduard Geldhof
by The Firm of Charles W. Hills Attys

Patented Feb. 12, 1952

2,585,107

UNITED STATES PATENT OFFICE 2,585,107

VIBRATION DAMPENER MOUNTING FOR WASHING MACHINES AND THE LIKE

Peter Eduard Geldhof, St. Joseph, Mich., assignor to Whirlpool Corporation, a corporation of New York Application November 20, 1946, Serial No. 711,131

8 Claims. (Cl. 248—22)

This invention relates to mountings which will snub or dampen vibrations.

More specifically this invention deals with mountings for washing machines that have snubber or dampening devices associated therewith to minimize transfer of vibrations, so that the machine need not be anchored to the floor.

The invention will hereinafter be specifically described as embodied in a washing machine which has a floating support for the driving and driven parts thereof, but it should be understood that the invention is generally useful for dampening out vibrations between movable machine parts and their supports and therefore the invention is not to be considered as limited for use in connection with the illustrated washing machine structure.

In accordance with this invention a main base supports a sub-base on rubber bushed posts or legs, and all driving and driven parts of the machine are mounted on this sub-base. This mounting arrangement provides a floating support for the driving and driven parts of the machine, since the rubber bushings for the posts or legs are resiliently deflectable.

While rubber is a preferred bushing material, it should be understood that any resilient bushings can be used, including springs, leather, or the like.

According to the invention, resiliently loaded snubbers or dampening devices preferably including brake lining material interposed between the main and sub-bases are used in such a manner as to dampen out transfer of vibration from the sub-base to the main base.

The construction of this invention renders unnecessary the bolting of the main base to the floor, and washing machines equipped with the mountings of this invention can merely rest on a floor and be operated without moving on the floor even though the operative parts thereof are driven at high speed and vibrate considerably.

It is, then, an object of this invention to provide a floating mounting with a vibration dampener or snubber that is effective to minimize transfer of vibrations.

Another object of the invention is to provide a machine with a floating support and a vibration dampener for the floating support.

A still further object of the invention is to provide a washing machine with vibration snubbing means that render unnecessary the heretofore required practice of bolting high-speed washing machines in fixed position on a floor.

Another object of the invention is to provide a washing machine with a sub-frame on which all driving and driven parts are mounted, and to interpose snubbers between this sub-frame and the main supporting frame for the machine.

A specific object of the invention is to provide a washing machine having a main base carrying resiliently bushed legs which support a sub-base, and having brake-band material-equipped snubbing devices interposed between the main and sub-bases.

Other and further objects of the invention will be apparent to those skilled in the art from the following detailed descriptions of the annexed sheets of drawings which, by way of preferred examples only, illustrate several embodiments of the invention.

On the drawings:

Figure 1 is a front elevational view, with parts broken away in vertical cross section, of a washing machine equipped with vibration dampeners according to this invention.

Figure 2 is a horizontal cross-sectional view taken along the line II—II of Figure 1.

Figure 3 is an enlarged fragmentary vertical cross-sectional view taken along the line III—III of Figure 1.

Figure 4 is a fragmentary view similar to Figure 3 but illustrating the initial unloaded condition of the pressure-applying rubber bushing.

Figure 5 is a fragmentary top plan view with parts in horizontal cross section, of an alternate snubber arrangement according to this invention.

Figure 6 is a vertical cross-sectional view taken along the broken line VI—VI of Figure 5.

Figure 7 is a fragmentary front elevational view, with parts in vertical cross section, of a washing machine equipped with a spring loaded snubber arrangement in accordance with a further modification of this invention.

Figure 8 is a fragmentary vertical cross-sectional view, with parts in elevation, taken along the line VIII—VIII of Figure 7.

As shown on the drawings:

Figure 9:
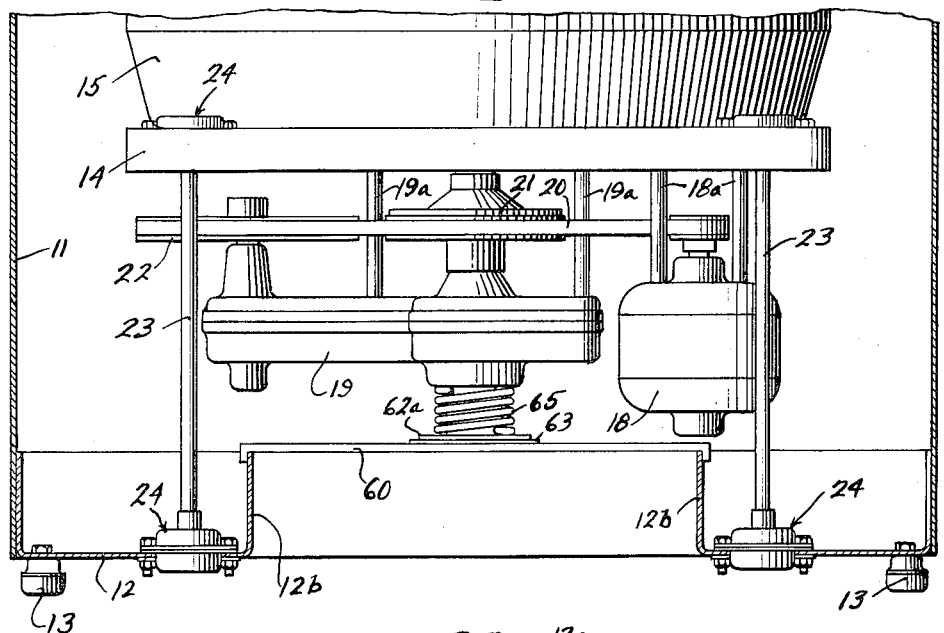
Figure 9 is a view similar to Figure 7, but showing another embodiment of the invention.

Referring to the first embodiment of the invention, illustrated in Figure 1 of the drawings, it will be noted that the washing machine 10 includes a cabinet 11 carried on a rigid base frame 12, which is also shown in Figure 2. The rigid base frame 12 is supported on a plurality of feet 13 which serve to space the frame slightly above floor level.

A sub-base 14 is mounted within the cabinet 11 in spaced relation above the main base frame 12. An imperforate tub 15 is mounted on the sub-base 14 and has a top collar 15a through which clothes may be inserted into the interior of the tub. A perforated basket 16 is rotatably mounted in the tub 15 on a hollow vertical spindle 16a journalled in the sub-base 14. This basket 16 receives the clothes therein and, after the washing operation, the basket is spun at high speed to dry the clothes. An agitator 17 is mounted within the basket 16 on a vertical shaft 17a projecting through the hollow spindle 16a. The agitator is arranged to be oscillated within the basket 16.

An electric motor 18 is suspended from the sub-base 14 on rods such as 18a, and a transmission unit 19 is also suspended from this same sub-base 14 on rods such as 19a. The motor 18 drives a belt 20 trained around pulleys 21 and 22. The pulley 22 drives gears (not shown) in the transmission unit 19 which oscillate the shaft 17a. The pulley 21 is coupled to the hollow spindle 16a and serves to rotate the basket 16 at high speed.

From the above descriptions, it should be understood that all of the driving and driven mechanism for the washing machine, as well as the tub of the machine, is mounted on the sub-base 14, and is independent of the casing 11 or the main frame base 12.

The sub-base 14 is supported above the main base 12 on four legs or posts 23. These legs preferably are in the form of solid steel rods. The main base 12 has a pair of open topped channels 12a, 12a extending longitudinally thereacross in spaced relation inwardly from the sides thereof as best shown in Figure 2, and the legs 23 extend into these channels. Housings 24 for rubber bushings 25 are mounted in the bottoms of the channels and foot members 23a threaded on the lower ends of the legs 23 are embedded in these rubber bushings 25.

As best shown in Figure 3, each housing 24 is composed of a bottom cup 26 and a top apertured inverted cup 27. The cup 26 snugly seats in an aperture formed in the base of the channel 12a and also in the main base 12, and has a peripheral flange 26a overlying the base of the channel. Bolts 28 are passed through the flanges 26a and 27a and also through the bottom of the channel 12a and through the main base 12. Nuts 29 threaded on the bolts 28 tighten the assembly and clamp the cups of the housing 24 together. The inverted cup 27 has an aperture 27b in its top wall surrounding the foot 23a in spaced relation so that loaded rubber from the bushing 23 can flow into the opening. The foot 23a has an enlarged head section on the end thereof centrally embedded in the bushing 25. The foot 23a can be vulcanized to the bushing if desired.

An identical foot and bushing housing arrangement is provided for the upper end of each leg 23. Thus, as shown in Figure 1, the upper end of the leg 23 has a foot 23a thereon projecting into the housing 24 which is composed of the cups 26 and 27 held together on the sub-base 14 by nut and bolt assemblies including bolts 28 and nuts 29. The above described legs and rubber bushings provide a floating mounting for the sub-base 14 on which all of the driving and driven parts of the machine are mounted. Vibration of the machine during operation will cause the sub-base 14 to wobble and gyrate, and this wobbling action is accommodated by interparticle flow of the rubber in the bushings 25. Thus the legs 23, by being embedded in rubber mountings, will accommodate relative movement between the sub-base and main base, and will somewhat lessen transmission of vibrations to the main base and cabinet.

In accordance with this invention, free wobbling or gyrating movements of the legs 23 is snubbed and damped by snubbing devices which are provided for each leg.

In the embodiment of the invention shown in Figures 1 to 4, each snubbing device includes a base plate or pad 30 surrounding each leg 23 and straddling the channel 12a. Each plate 30 has a central aperture 30a of substantially larger diameter than the legs 23 and the legs 23 extend centrally through this aperture to be in spaced relation from the pad. The pad has a downturned flange 30b overhanging the channel 12a and is preferably welded or otherwise fixedly secured to the channel.

A disk 31 of friction material, such as fibrous brake liner, is mounted on top of each pad 30 and has a central aperture therethrough of the same diameter as the leg 23 to snugly receive the leg. The friction member 31 has extensive surface contact with the top face of the pad 30.

An assembly for loading the friction member 31 is provided on each leg 23 above the friction member. This assembly includes a rubber block 32 having a bottom end face clad with a metal end cover 33 and a top end face clad with a cover 34 having an upstanding internally threaded boss portion 34a. The leg 23 extends through block 32 and through apertures in the end covers 33 and 34 as well as through the boss portion 34a. The end covers have apertures, receiving the legs, which are substantially larger than the legs so that metal to metal contact between the leg and covers does not occur. A hollow stud 35 is slidably mounted on each leg 23 and has an externally threaded shank portion 35a adapted to be threaded into the internally threaded boss 34a of the end cover 34. A head 35b adapted to be engaged by a wrench is provided on the end of the stud.

A collar 36 is mounted on the leg 23 above the head of the stud and is locked against axial movement on the leg by a set screw 37. The collar is positioned, as shown in Figure 4 of the drawings, so that when the stud 35 is threaded into the base of the boss 34a, no thrusting pressure will exist between the collar and stud. Under these conditions the rubber block 32 is unloaded and undeformed as shown in Figure 4. As the stud 35 is threaded out of the boss 34a, a load is placed on the rubber bushing 32 because the end cover 34 is forced downwardly and, as a result, the rubber will assume the bowed deformed shape shown in Figure 3. The load on the rubber, in turn, is transmitted through the end cap 33 to the friction material 31, thereby applying braking pressure on the friction member and resisting movement of this member on the base pad 30. Any desired degree of braking pressure can be maintained by adjustment of the stud 35. The pressure, by being applied through a resilient rubber block, is uniformly maintained on the friction member and, even though the member compresses or wears after use, the loaded rubber block, in tending to reclaim its unloaded position, will compensate against this compression or wear.

Since wobbling or gyratory movements of the legs imparts similar movements to the friction material, and since this friction material rubs on stationary pads or plates, it is quite evident that the wobbling or gyratory movements will be snubbed and dampened out. At the same time, the snubbing action does not destroy the floating relationship between the sub-base and the main base, since no rigid connections are established.

The snubbing action can easily be changed as desired by adjustment of the pressure applying studs 35.

Snubbing action, similar to that described in connection with the embodiment shown in Figures 1 to 4, can also be obtained with the arrangement shown in Figures 5 and 6, wherein parts identical with parts described in Figures 1 to 4 have been marked with the same reference numerals. In Figures 5 and 6, the sub-base 14 is floatingly mounted from the main base on the legs such as 23 which are embedded in rubber bushings at their ends. The top rubber bushing 25, instead of being encased in a two-cup housing 24, as described hereinabove, is encased in a one-piece housing 24a having an open top and an apertured bottom to receive the shank of the foot member 23a freely therethrough. The cup housing 24a has a peripheral flange therearound bolted to the bottom face of the sub-base 14. The base 14 is not apertured and overlies the open top of the housing 24a.

A plate member 40 is mounted in each corner of the cabinet 11 to project inwardly therefrom in overlying relation to the adjoining corner of the sub-base 14. These plates 40 have down-turned corner flanges 41 with vertically elongated slots 42 therein. Bolts 43 project through the wall of the cabinet 11 into the slots 42 and nuts 44 on the bolts act on washers 45 overlying the flanges 41 to clamp the plate against movement relative to the cabinet 11. The elongated slots 42 permit vertical adjustment of the plates in the cabinet.

The portion of each plate 40 which overlies a corner of the sub-base 14 has friction material such as fibrous brake liner 46 mounted on the under face thereof as by means of rivets 47 or the like. This friction material 46 is held, by the plate 40, in pressure relationship with the sub-base 14 and serves to dampen out or snub free wobbling or gyratory movements of the sub-base caused by vibration of the parts mounted thereon. This friction snubber functions in the same manner as the snubber described in Figures 1 to 4.

In the embodiment shown in Figures 7 and 8, the arrangement is substantially identical with that described in Figures 1 to 4 and identical parts have been marked with the same reference numerals. In Figures 7 and 8, instead of using the loaded rubber blocks 32, or the plate 40, to apply pressure to the friction member, springs 50 are used. These springs are interposed between the collars 36 and pads 51 overlying the friction members 31. The collar 36 is adjustable on the plate 23 to control the spring load. The sub-base 14, being floatingly mounted on legs 23 which are embedded in rubber, has its vibrations snubbed or damped by a spring-impelled friction brake device for each leg, which device does not lock out the floating relationship between the sub-base and the main base.

Figure 10:
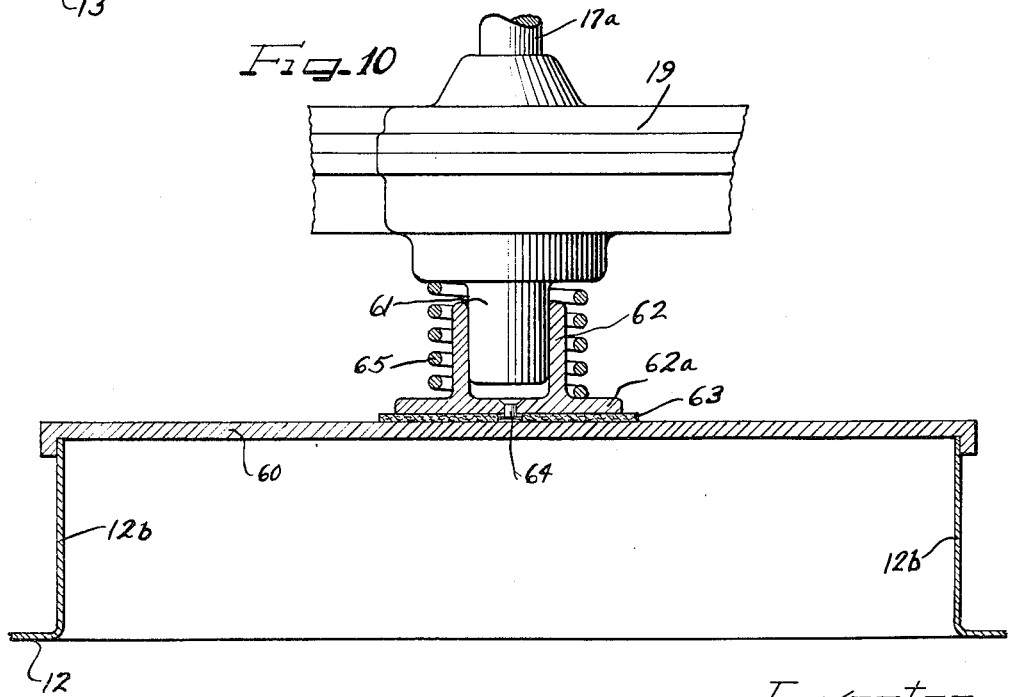
Figure 10 is an enlarged fragmentary elevational view, with parts in vertical cross section, of a portion of the mounting of Figure 9.

In the embodiment shown in Figures 9 and 10, parts also identical with parts described in detail in connection with Figures 1 to 4 have been marked with the same reference numerals. In Figures 9 and 10, the main base 12 has upstanding parallel flanges 12b in place of the channels 12a. A pad or plate 60 spans the open space between the channels 12b and is mounted on these channels to underlie a boss 61 on the transmission casing 19 for the machine. A nipple 62 is slidably mounted on the boss 61 and has a foot or base 62a providing an extended flat surface on the end thereof. A friction member 63, composed of fibrous brake band material or the like, is preferably affixed to the bottom face of the foot 62a by means of rivets 64 or the like. A spring 65 is compressed between the transmission casing 19 and the foot 62a in surrounding relation to the cylindrical portion of the nipple and exerts pressure on the friction material 63. Since the transmission casing 19 is rigidly suspended from the sub-base 14 on the rods 19a, vibratory movements of the sub-base and the parts carried thereby is transmitted to the boss 61 of the transmission casing, and these movements are dampened or snubbed by the spring-pressed friction arrangement between this boss and the main base 12.

From the above descriptions it will be understood that numerous arrangements can be interposed between a floating sub-base and a main base for dampening out vibrations. These arrangements can act through legs, cabinet, or sub-base mounted structure. The snubbers or dampeners of this invention are effective to render unnecessary the bolting or anchoring of a washing machine to a floor, even though the machine has operating parts which, if directly connected to a rigid base, would cause the base to shift or "walk" on the floor.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A machine suspension comprising a main base, rubber bushings fixedly carried by said main base and confined for the interparticle flow of rubber in a generally vertical direction, legs embedded in said rubber bushings and held thereby in upright position, a sub-base mounted on said legs above said main base, rubber bushings fixedly mounted in said sub-base and confined for the interparticle flow of rubber in a vertical direction opposed to direction of flow of rubber of said bushings carried by said main base and having the upper ends of said legs embedded therein, said sub-base being movable relative to said main base through interparticle flow of rubber in the bushings, friction means associated with said legs and interposed between the main and sub-bases, and yieldable means loading said friction means to dampen out vibrations of the sub-base without locking the sub-base and main base together for co-movement.

2. In a washing machine or the like, a main base, channel members on said main base, rubber bushings fixedly mounted on said main base at the bottoms of said channel members, legs embedded in the rubber bushings and projecting upwardly through the channel members, rubber bushings mounted on the upper ends of said legs, a sub-base fixedly connected to said rubber bushings above said main base, pad members straddling said channels of the main base and receiving the legs freely therethrough, friction material surrounding said legs and mounted on said pad members, resiliently urged means acting on said friction means, and adjustable devices for loading said resiliently urged means to maintain the friction members in tight frictional engagement with said pads and thereby dampen out vibrations of the sub-base without transferring the vibrations to the main base.

3. A washing machine comprising a main base, a cabinet carried by said main base, rubber bushings mounted on said main base, legs embedded in said rubber bushings and extending upwardly from said main base within said cabinet, a sub-base within said cabinet mounted on said legs, resilient bushings interposed between the legs and sub-base, a washing machine tub mounted on said sub-base, movable washing machine parts within said tub, driving means for said parts suspended from said sub-base, pads mounted on said main base surrounding said legs in spaced relation from the legs, friction brake material mounted on said pads, rubber blocks on said legs acting on said brake material, and adjustable devices bottomed on said legs acting on said rubber blocks to load the blocks for resiliently urging the brake material against the pads to dampen out vibration between the legs and main base.

4. A snubber device for machine suspensions and the like comprising a main mounting, a leg resiliently carried by said main mounting, a braking surface carried by said main mounting in spaced relation around said leg, friction brake material on said braking surface, a rubber block surrounding said leg, caps on the ends of said rubber block, one of said caps acting on said friction brake material, the other of said caps having an internally threaded hollow boss, a hollow shank slidable on said leg and threaded in said boss, collar means locked on said leg for bottoming said hollow shank, and said hollow shank having a head adapted to be engaged by a wrench for rotating the shank to unscrew the same out of said hollow boss to load the rubber block and resiliently urge the friction brake material on the brake surface thereby dampening movements of the leg relative to the main base.

5. In a vibration dampening mounting for a rotating object, a main base, a sub-base spaced vertically with respect thereto and having the rotating object mounted thereon, and a yieldable generally horizontally movable support for said sub-base on said main base including a plurality of rubber bushings secured to said main base and to said sub-base in spaced relation with respect to each other and confined to flow in vertical directions toward each other, a plurality of supporting legs embedded at their opposite ends in said bushings and yieldably supporting said main base on said sub-base for axial movement about the lower ends of said legs, means for restraining axial movement of said legs including generally horizontal engaging friction members and stationary members associated with said legs and said main frame and means yieldably urging said members into engagement with each other and dampening axial movement of said sub-base.

6. In a vibration dampening mounting for a rotating object, a main base, a sub-base spaced vertically with respect thereto and carrying the rotating object thereon, a plurality of spaced legs supporting said sub-base on said main base for yieldable movement with respect thereto, yieldable supporting connections between said legs and said bases including a plurality of rubber bushings secured to said main base and said sub-base in facing relation with respect to each other and confined for the interparticle flow of rubber in a vertical direction, said bushings on said main and sub-bases having opposite ends of said legs embedded therein and means dampening movement of said legs and said sub-base including a plurality of horizontal plate members and a plurality of horizontal friction members engageable with said plate members one group of said members being movable with said legs and sub-base and the other being stationary, means yieldably engaging said members with each other, and means varying the engaging pressure of said members.

7. In a vibration dampening mounting for a rotating object including a main base, a sub-base spaced vertically with respect thereto and carrying a rotating object thereon, a plurality of vertical legs supporting said sub-base on said main base for yieldable movement with respect thereto in a generally horizontal axial direction about the lower ends of said legs, mountings for said legs on said main and sub-bases including a plurality of rubber bushings secured to said main and to said sub-bases and having opposite ends of said legs embedded therein and confined for the interparticle flow of rubber in vertical directions, a stationary plate encircling each of said legs and spaced therefrom to allow free movement of the associated leg with respect thereto, an engaging member mounted on each of said legs for engagement with an associated stationary member, one of said members having a friction engaging surface thereon, and means selectively operable to vary the engaging pressures of said members including rubber blocks mounted on said legs for engagement with said engaging members and means varying the engaging pressure of said blocks on said members.

8. In a washing machine or the like, a main base, channel members on said main base, rubber bushings fixedly mounted on said main base at the bottoms of said channel members, legs embedded in the rubber bushings and projecting upwardly through the channel members, rubber bushings mounted on the upper ends of said legs, a sub-base fixedly connected to said rubber bushings above said main base, pad members straddling said channels of said main base and receiving said legs freely therethrough, friction members associated with said legs and engaging said pad members, resiliently urged means acting on said friction members, and adjustable devices for loading said resiliently urged means to maintain the friction members in tight frictional engagement with said pad members and thereby damp out vibrations of said sub-base without transferring the vibrations to said main base.

PETER EDUARD GELDHOF.

REFERENCES CITED

The following references are of record in the file of this patent:

UNITED STATES PATENTS

| Number | Name | Date |
|---|---|---|
| 2,005,934 | Carter | June 25, 1935 |
| 2,243,565 | Kimball et al. | May 27, 1941 |
| 2,243,660 | Thompson | May 27, 1941 |
| 2,268,204 | Dunham | Dec. 30, 1941 |
| 2,296,261 | Breckenbridge et al. | Sept. 22, 1942 |
| 2,365,989 | Ailes | Dec. 26, 1944 |
| 2,386,788 | Geldhof | Oct. 16, 1945 |
| 2,414,506 | Bowen | Jan. 21, 1947 |
| 2,425,565 | Robinson | Aug. 12, 1947 |
| 2,432,050 | Thiry | Dec. 2, 1947 |